3,033,653
PREPARATION OF CARBON-FREE PHOSPHORUS
Rudolf G. Brautigam, New Brunswick, N.J., assignor to
The American Agricultural Chemical Company, New
York, N.Y., a corporation of Delaware
No Drawing. Filed June 27, 1960, Ser. No. 38,709
10 Claims. (Cl. 23—223)

This invention relates to elemental phosphorus. More particularly, this invention relates to the preparation of substantially carbon-free elemental phosphorus. Still more particularly, this invention relates to the preparation of semi-conductor grade elemental phosphorus.

Phosphorus is employed as a chemical constituent, usually combined with another element, in certain semi-conductor and electronic devices. The phosphorus employed in the manufacture of such devices must be substantially chemically pure, i.e., substantially free of any impurities which adversely affect the electrical or other physical properties of these devices.

Commercially available elemental phosphorus such as elemental phosphorus recovered directly from an electric furnace wherein calcium phosphate is reacted under high temperature conditions with silicon dioxide and coke is about 99% pure. An impurity usually present in commercial elemental phosphorus is carbon. The presence of carbon, such as an amount of carbon in the range 0.04–0.4% by weight, in elemental phosphorus usually makes the elemental phosphorus unsuitable for use as a chemical constituent or component in certain high performance electronic devices. No completely satisfactory technique has been commercially developed for the removal of carbon-containing impurities from elemental phosphorus.

Accordingly, it is an object of this invention to provide a method for the removal of carbon-containing impurities from elemental phosphorus.

It is another object of this invention to provide a method for the preparation of substantially carbon-free elemental phosphorus.

Still another object of this invention is to provide a method for the manufacture of semi-conductor grade elemental phosphorus.

Yet another object of this invention is to provide a method for the preparation of elemental phosphorus having a carbon content less than about five parts per million by weight.

How these and other objects of this invention are achieved will become apparent in the light of the accompanying disclosure.

It has now been discovered that carbon-containing impurities can be removed from elemental phosphorus by subjecting elemental phosphorus containing a carbon-containing impurity to an elevated temperature. The elevated temperature should be sufficient to thermally crack the carbon-containing impurity, such as a hydrocarbon, therein with the resultant production or liberation of elemental carbon. The elemental carbon is then separately recovered or removed from the resulting heat treated phosphorus vapor to yield as product phosphorus having a substantially reduced carbon content or substantially free of carbon.

More particularly, in accordance with the invention, substantially carbon-free elemental phosphorus is prepared by vaporizing a mass of elemental phosphorus containing a carbonaceous or carbon-containing material as an impurity therein. Desirably, the mass of elemental phosphorus is vaporized at a reduced pressure, such as a pressure in the range 0.1–100 mm. Hg absolute, more or less. Any temperature suitable to effect vaporization of the elemental phosphorus may be employed, such as a temperature in the range 90–300° C., more or less. The resulting vaporized phosphorus together with any carbon-containing impurity is then subjected to a high temperature, such as a temperature greater than 500° C., e.g., a temperature in the range 800–1200° C., for a period of time, such as a time in the range of 0.1–10.0 secs., more or less, sufficient to effect thermal cracking of any hydrocarbon or similar carbonaceous material admixed with the vaporized phosphorus. Following the above heat treatment or thermal cracking operation the resulting heat treated phosphorus vapor is separately recovered from any elemental carbon present or formed during the heat treatment or thermal cracking operation.

In accordance with one feature of this invention separation of elemental carbon from the heat treated phosphorus vapor is effected by carrying out the heat treatment or thermal cracking operation in the presence of solid refractory contact material. Quartz is particularly suitable as a solid contact material in accordance with the practice of this invention. Other suitable solid inert refractory contact materials are known and include in addition to quartz or silica the various high melting point ceramic materials, zirconia and the like.

When the heat treatment operation is carried out in the presence of solid contact material, any elemental carbon present or produced during the heat treatment operation tends to deposit on the surfaces of the contact material and to be retained thereon, the vaporized phosphorus leaving the heat treatment or thermal cracking zone as effluent substantially free of any carbon-containing impurity such as elemental carbon. Other impurities such as boron, nickel, copper, silicon, antimony, magnesium and iron which may be present are also deposited on the contact material.

Following the heat treatment operation the elemental phosphorus is condensed and collected in a suitable receiver. After a suitable amount of purified phosphorus has been collected, it is recovered as product. During the product recovery operation it is desirable to blanket the purified phosphorus with an inert atmosphere such as gaseous nitrogen or one of the inert gases, helium, argon, neon and the like. This can suitably be accomplished by sweeping the heat treatment zone and the cooling zone wherein the vaporized phosphorus is condensed and/or solidified, during and/or subsequent to the heat treatment operation, with a stream of the inert gas.

In accordance with one feature of this invention it may be desirable to employ as the solid, refractory contact material a material which exhibits catalytic cracking properties with respect to hydrocarbons. Suitable catalytic cracking refractory contact materials are alumina and the various alumino-silicate clays. These materials are readily commrcially available and are well known for their catalytic cracking properties with respect to hydrocarbons. By employing such active solid contact materials, the thermal cracking of any hydrocarbon or carbonaceous impurity in the elemental phosphorus undergoing heat treatment can be effected at a temperature substantially lower than in the absence of such materials.

As indicated hereinabove the carbon-containing impurity present in the elemental phosphorus is usually present in a minor but significant amount, such as an amount in the range 0.04–0.04% by weight carbon. The carbon-containing or carbonaceous impurity effectively removed in the practice of this invention may comprise substantially only elemental carbon such as coke or substantially only hydrocarbons or hydrocarbonaceous or carbonaceous compounds, such as a high molecular weight tarry, carbonaceous or bituminous refractory hydrocarbon, e.g. an aromatic hydrocarbon containing at least 12 carbon atoms per molecule and having a molecular weight of at least about 150, or mixtures thereof. If the carbon-containing or carbonaceous impurity is a hydrocarbon, thermal cracking of the hydrocarbon during the heat treatment operation in the practice of this invention leads to the formation of elemental carbon and gaseous hydrogen. The thus-produced gaseous hydrogen tends to react with the phosphorus present during the heat treatment operation to yield gaseous phosphine. Phosphine ($PH_3$), however, is relatively thermally unstable and decomposes at about 500° C. to yield phosphorus and hydrogen. It is thus seen that in the instance where the carbonaceous impurity is a hydrocarbon, if the heat treatment operation is carried out above the temperature at which the phosphine decomposes, such as above about 500° C., there issues as gaseous effluent from the heat treatment zone a gaseous admixture comprising phosphorus and hydrogen. The elemental carbon produced during the heat treatment operation due to thermal cracking of the hydrocarbon is deposited on the surfaces of the solid contact material present within the heat treatment or thermal cracking zone.

Various means such as porous ceramic filters, cyclone separators, etc. may be employed for effecting removal of the elemental carbon from the gaseous heat treated phosphorus vapors. It is preferred, however, in the practice of this invention to effect separation of the elemental carbon from the heat treated phosphorus vapors by contacing the heat treated phosphorus vapors containing elemental carbon admixed therewith with solid contact material such as a mass of quartz helices or other suitable shapes. As the heat treated phosphorus vapors pass therethrough the elemental carbon tends to be deposited on the surfaces of the solid contact material and is thereby effectively removed and separated from the heat treated phosphorus vapors.

The following example is illustrative of the practice of this invention.

*Example*

Elemental yellow phosphorus containing a carbon-containing impurity therein in an amount in the range 0.04–0.4% by weight carbon is vaporized at a reduced pressure of about 5 mm. Hg absolute and at a temperature in the range 100–110° C. The resulting phosphorus-containing vapors together with any volatilized carbonaceous impurity is led through a quartz combustion tube filled with quartz helices. Within the combustion tube the phosphorus-containing vapors are heated to an elevated temperature sufficient to thermally crack the carbonaceous or hydrocarbon-like material admixed therewith, such as a heat treatment or thermal cracking temperature in the range 800–1200° C. Upon passage through the heat treatment zone of the quartz combustion tube in contact with the quartz helices therein elemental carbon formed during the heat treatment operation or present in the phosphorus-containing vapors supplied to the heat treatment zone is deposited on the surfaces of the quartz helices. The heat treated phosphorus vapors issue from the heat treatment zone of the combustion tube substantially free of any carbon-containing impurity. The resulting substantailly carbon-free phosphorus vapors are then cooled to condense the phosphorus within a suitable receiver. After a sufficient amount of purified elemental phosphorus has been collected in the receiver an inert purge gas is passed through the quartz combustion tube to displace any residual phosphorus vapors therefrom and to blanket the purified phosphorus in the receiver to prevent contact of the purified phosphorus with atmospheric oxygen. The thus-purified phosphorus is then recovered as product.

As a result of the above-described heat treatment operation the amount of carbon-containing impurity present in the recovered heat treated phosphorus is substantially reduced as compared to the amount of carbon-containing impurity originally present in the elemental phosphorus. For example, by following the practice of this invention it is possible to reduce the carbon content of elemental phosphorus to an insignificant amount, or indeed, to any desired extent. Usually a reduction in carbon content of the elemental phosphorus to an amount in the range not more than about 4–5 parts per million by weight yields elemental phosphorus suitable for the uses contemplated herein. If it is desired to further reduce the carbon content of the elemental phosphorus the heat treated phosphorus product can again be vaporized and heat treated in contact with solid contact material to effect a further reduction in carbon content, such as an amount in the range 0.1 p.p.m. or less.

In the practice of this invention the solid contact material employed in the heat treatment or thermal cracking zone to effect deposition of elemental carbon thereon can be discarded after use, particularly when its ability to effect the adsorption or deposition of additional carbon thereon is exhausted. If desired, however, the solid contact material can be regenerated by burning off the deposited carbon at a suitable elevated temperature by passing in contact therewith oxygen-containing gas such as air or substantially pure oxygen.

As will be apparent to those skilled in the art in the light of the foregoing disclosure, many modifications, alterations and substitutions are possible in the practice of this invention without departing from the spirit or scope thereof.

I claim:

1. A method of removing a carbon-containing impurity from phosphorus which comprises vaporizing a mass of elemental phosphorus having a carbon-containing impurity therein, subjecting the vaporized phosphorus to an elevated temperature above about 500° C. in the presence of inert, refractory, solid contact material for a period of time sufficient to cause the carbon in said impurity to deposit upon said contact material and separately recovering in an inert atmosphere the resulting treated phosphorus now having a substantially reduced content of said carbon-containing impurity.

2. A method in accordance with claim 1 wherein said temperature is in the range 800–1200° C.

3. A method in accordance with claim 1 wherein said solid contact material is quartz.

4. A method of removing carbonaceous material from a mass of elemental phosphorus containing carbonaceous material as an impurity therein which comprises vaporizing said mass of elemental phosphorus, subjecting the resulting vaporized phosphorus to an elevated temperature above about 500° C. for a period of time in the range 0.1–10 seconds in the presence of inert, refractory, solid contact material to cause the carbon in said impurity to deposit upon said contact material and separately recovering the resulting treated phosphorus in an inert atmosphere.

5. A method in accordance with claim 4 wherein said refractory bodies are quartz bodies.

6. A method in accordance with claim 1 wherein said carbon-containing impurity is a hydrocarbon.

7. A method in accordance with claim 1 wherein said carbon-containing impurity is carbon.

8. A method in accordance with claim 1 wherein the carbon content of the resulting recovered vaporized, heat treated phosphorus is not more than about 5 p.p.m.

9. A method in accordance with claim 4 wherein the carbon content of the resulting recovered vaporized, heat treated phosphorus is not greater than about 5 p.p.m.

10. A method in accordance with claim 4 wherein said temperature is in the range 800–1200° C.

References Cited in the file of this patent

FOREIGN PATENTS 6,818    Great Britain _____ 1899

OTHER REFERENCES

J. W. Mellor's "A Comprehensive Treatise on Inorganic and Theoretical Chemistry," vol. 8, 1928 ed., page 743.

McPherson and Henderson book: "A Course in General Chemistry," third ed. (1927), page 385, Ginn & Co., N.Y.